(12) United States Patent
Zheng

(10) Patent No.: US 7,249,750 B2
(45) Date of Patent: Jul. 31, 2007

(54) PRESSURE BALANCED FLUID CONTROL DEVICE

(75) Inventor: Qiu Shi Zheng, Spring, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 11/381,778

(22) Filed: May 5, 2006

(65) Prior Publication Data
US 2006/0192169 A1    Aug. 31, 2006

Related U.S. Application Data

(62) Division of application No. 10/772,623, filed on Feb. 5, 2004, now Pat. No. 7,066,444.

(51) Int. Cl.
*F16K 39/02*    (2006.01)

(52) U.S. Cl. .................. 251/214; 251/282; 251/326

(58) Field of Classification Search ................ 251/214, 251/282, 326–329
See application file for complete search history.

(56) References Cited

U.S. PATENT DOCUMENTS

| | | | | |
|---|---|---|---|---|
| 2,650,616 A | * | 9/1953 | Wilkinson et al. .......... | 251/326 |
| 2,923,310 A | * | 2/1960 | Eckert, Jr. .................. | 251/326 |
| 3,036,807 A | * | 5/1962 | Lucky et al. ................ | 251/326 |
| 3,095,004 A | * | 6/1963 | Jackson, Jr. et al. ........ | 251/172 |
| 3,348,567 A | * | 10/1967 | Volpin ......................... | 251/327 |
| 3,538,938 A | * | 11/1970 | Volpin .................... | 137/246.12 |
| 3,770,247 A | | 11/1973 | Nelson ........................ | 251/282 |
| 4,029,294 A | * | 6/1977 | McCaskill et al. ........... | 251/282 |
| RE30,115 E | * | 10/1979 | Herd et al. .................. | 251/282 |
| 4,294,284 A | * | 10/1981 | Herd ........................... | 251/327 |
| 4,363,465 A | * | 12/1982 | Morrill ........................ | 251/214 |
| 4,373,700 A | * | 2/1983 | Buchta ........................ | 251/214 |
| 5,143,348 A | * | 9/1992 | Baker et al. ................. | 251/326 |
| 6,024,122 A | | 2/2000 | Steinke ........................ | 137/545 |
| 2004/0099832 A1 | | 5/2004 | Gessaman ................... | 251/282 |

* cited by examiner

*Primary Examiner*—John Bastianelli
(74) *Attorney, Agent, or Firm*—Williams, Morgan & Amerson, P.C.

(57) ABSTRACT

The present invention is directed to a pressure balanced fluid control device. In one illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and an opening through the bonnet that is adapted to allow a pressure of a working fluid flowing through the valve to be exerted in the sealed cavity above the valve stem seal. In another illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and an opening through the bonnet, the opening being in fluid communication with the sealed cavity and an interior region of the body. In a further illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, a piston chamber formed in the bonnet, the piston chamber being in fluid communication with the sealed cavity and an interior region of the body, and a piston positioned in the piston chamber.

35 Claims, 4 Drawing Sheets

PRESSURE BALANCED FLUID CONTROL DEVICE

CROSS-REFERENCE TO RELATED APPLICATION

This is a divisional of application Ser. No. 10/772,623, filed Feb. 5, 2004 now U.S. Pat. No. 7,066,444.

BACKGROUND OF THE INVENTION

1. Field of the Invention

The present invention is generally related to the field of pressure control devices, and, in one particular example, to a pressure balanced fluid control device.

2. Description of the Related Art

Fluid control devices, such as gate valves, are commonly employed in a variety of different industries, e.g., surface and subsea oil and gas drilling and producing industries. Gate valves may be classified as either balanced stem or unbalanced stem valves. As is well known in the art, in an unbalanced stem gate valve, there is a net force exerted on the valve stem. In some cases, this force may be equal to the pressure exerted within the valve body multiplied by the seal area of the stem. In unbalanced gate valve designs, it is often necessary to limit the stem seal area to reduce the unbalanced stem force and thus the operating torque required to actuate the gate valve. Although reducing the stem seal area may reduce unbalanced forces, such a limitation may place a number of undesirable constraints on the design of a gate valve.

In some embodiments, particularly surface valves, balanced stem gate valves include a second stem attached to the opposite end of the gate wherein the second stem has essentially the same seal area as the valve stem. Accordingly, there is no net force acting on the valve stem. One drawback to the use of such a balanced stem design is that the second stem increases the size, cost and complexity of the valve, and introduces additional potential leak paths. For example, in many subsea applications, there is no available space for incorporating a balance stem into the design of the subsea equipment, e.g., a Christmas tree.

FIG. 1 depicts one illustrative embodiment of a prior art balanced stem gate valve 10. In general, the gate valve 10 is comprised of a body 12, a bonnet 14, a gate 16 having an opening 18 formed therethrough, and a seal 15, e.g., typically a metal gasket. The gate valve 10 further comprises a plurality of flanges 29 and it has an opening 31 formed therethrough to allow working fluid to pass through the gate valve 10 when the gate 16 is positioned such that the opening 18 in the gate 16 is aligned with the opening 31 through the body 12. The bonnet 14 is secured to the body 12 by a plurality of nuts and studs, generally indicated by the reference number 14a. The gate valve 10 further includes a valve stem 20 and a pressure balance stem 22. The valve stem 20 is coupled to the gate 16 by a lifting nut 21. A pin 21A couples the lifting nut 21 to the stem 20 such that there is no rotation between these components. A directional valve stem seal 11, e.g., UV elastomer packing, is positioned in the bonnet 14 around the valve stem 20. The pressure balance stem 22 is positioned within a balance stem housing 22a that is coupled to the body 12 by a plurality of studs and nuts, generally indicated by the reference number 22b. A directional seal 13 is positioned around the pressure balance stem 22.

The gate valve 10 further comprises means for actuating the gate 16. In the depicted embodiment, the valve 10 employs a roller screw assembly 24 and an actuator handle assembly 28. Hydraulic or electrical actuators can also be employed with the valve 10 if desired. The roller screw assembly 24 is partially positioned within a bonnet cap 26 that is threadingly coupled to the bonnet 14 at a threaded connection 27. A plurality of set screws 37 are used to further secure the bonnet cap 26 to the bonnet 14 after the threaded connection 27 is made. The roller screw assembly 24 further comprises a roller screw 30, a threaded nut 32, a roller screw housing 25, a plurality of bearings 36 and a key 34. The key 34 couples the roller screw nut 32 to the roller screw housing 25. An elastomer seal 40 is provided between the bonnet cap 26 and the roller screw housing 25. An elastomer seal 41 is positioned between the bonnet 14 and the bonnet cap 26. Also depicted in FIG. 1 are a plurality of openings 42 having threaded fasteners 43, e.g., screws, positioned therein. The openings 42 are provided as a means of providing lubricant to the bearings 36. In some cases, e.g., sub-surface applications, such openings would not typically be present. The valve stem 20 is threadingly coupled to the roller screw 30 via a threaded connection 33 (external threads on an end of the valve stem 20 engage an internally threaded opening formed in the roller screw 30). The valve stem 20 may further be coupled to the roller screw 30 by a pin 23.

Historically, gate valves have required a relatively large amount of torque to actuate the valve, e.g., actuation systems involving the engagement of high friction ACME threads. However, such high torque actuation systems present several problems. For example, with respect to manually actuated valves, such high torque valves required the generation of relatively large forces, thus making actuating such gate valves difficult and very time-consuming given that the actuating force was generated by an operator attempting to manually open or close the gate valve. Even in valves employing electrical or hydraulic actuators, the relatively large torque required to actuate the valve required that the actuator components be relatively large so that they could readily generate the necessary torque to actuate the gate valve in a timely manner.

However, in recent years, efforts have been made to reduce the torque required to actuate a gate valve. Such reduced torque is desirable because it requires less force to actuate the valve, e.g., the reduction in torque enables the use of smaller, less expensive actuators. Moreover, use of smaller actuators, e.g., electrical or hydraulic motors, is desirable in many applications in which there is limited space availability for such components. Unfortunately, problems may arise when using a relatively low torque actuating assembly, e.g., a roller screw assembly in an unbalanced gate valve. Due to the low friction and operating torque of the roller screw assembly, unbalanced stem forces may be sufficient to "back-drive" the roller screw 30 and thereby raise the gate 16. Of course, such a situation is undesirable from an operational point of view. Thus, when employing reduced force actuating assemblies, such as a roller screw assembly, it is usually necessary to employ a pressure balancing technique or device, e.g., a second pressure balancing stem, in an effort to avoid the "back-drive" situation described above. However, in addition to adding cost and complexity to a valve design, there are many applications where there is limited spaced available. Thus, the use of the pressure balanced stem 22 is undesirable in such a situation.

The present invention is directed to an apparatus and methods for solving, or at least reducing the effects of, some or all of the aforementioned problems.

SUMMARY OF THE INVENTION

The present invention is directed to a pressure balanced fluid control device. In one illustrative embodiment, the device comprises a body, a valve stem operatively coupled to a gate positioned in the body, a valve stem seal positioned around the valve stem, wherein a sealed cavity exists above the valve stem seal, and an opening in fluid communication with the sealed cavity and an interior region of the body, the opening allowing a pressure of the working fluid to be exerted in the sealed cavity above the valve stem seal.

In another illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and an opening through the bonnet that is adapted to allow a pressure of a working fluid flowing through the valve to be exerted in the sealed cavity above the valve stem seal.

In yet another illustrative embodiment, the device comprises a body, a valve stem operatively coupled to a gate positioned in the body, a valve stem seal positioned around the valve stem, wherein a sealed cavity exists above the valve stem seal, and an opening through the body that allows a pressure of the working fluid to be exerted in the sealed cavity above the valve stem seal.

In another illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and an opening through the bonnet, the opening being in fluid communication with the sealed cavity and an interior region of the body.

In yet another illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and an opening through the bonnet that is adapted to allow a working fluid flowing through the valve to enter the sealed cavity, thereby exerting a pressure of the working fluid in the sealed cavity above the valve stem seal.

In still another illustrative embodiment, the device comprises a body, a bonnet coupled to the body, a valve stem operatively coupled to a gate positioned in the body, a bonnet cap coupled to the bonnet, a roller screw assembly operatively coupled to the valve stem, the roller screw assembly comprising a housing, a portion of which extends through the bonnet cap, a first valve stem seal positioned between the valve stem and the bonnet, a second seal positioned between the bonnet cap and the bonnet, and a third seal positioned between the bonnet cap and the housing, wherein a sealed cavity exists above the first valve stem seal, the sealed cavity being defined by a portion of the bonnet cap, the first valve stem seal, the second seal and the third seal, and an opening through the bonnet that is adapted to allow a working fluid flowing through the device to enter the sealed cavity, thereby exerting a pressure of the working fluid in the sealed cavity above the valve stem seal.

In a further illustrative embodiment, the device comprises a body, a valve stem operatively coupled to a gate positioned in the body, a valve stem seal positioned around the valve stem, wherein a sealed cavity exists above the valve stem seal, a piston chamber, the piston chamber being in fluid communication with the sealed cavity and an interior region of the body, and a piston positioned in the piston chamber.

In yet a further illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, a piston chamber formed in the bonnet, the piston chamber being in fluid communication with the sealed cavity and an interior region of the body, and a piston positioned in the piston chamber.

In yet a further illustrative embodiment, the device comprises a body, a bonnet coupled to the body, a valve stem operatively coupled to a gate positioned in the body, a bonnet cap coupled to the bonnet, a roller screw assembly operatively coupled to the valve stem, the roller screw assembly comprising a housing, a portion of which extends through the bonnet cap, a first valve stem seal positioned between the valve stem and the bonnet, a second seal positioned between the bonnet cap and the bonnet, and a third seal positioned between the bonnet cap and the housing, wherein a sealed cavity exists above the first valve stem seal, the sealed cavity being defined by a portion of the bonnet cap, the first valve stem seal, the second seal and the third seal, a piston chamber formed in the bonnet, the piston chamber being in fluid communication with the sealed cavity and an interior region of the body, and a piston positioned in the piston chamber.

In still a further illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and means for allowing a pressure of a working fluid flowing through the valve to be exerted in the sealed cavity while preventing the working fluid from entering the sealed cavity.

BRIEF DESCRIPTION OF THE DRAWINGS

The invention may be understood by reference to the following description taken in conjunction with the accompanying drawings, in which like reference numerals identify like elements, and in which.

Figure 1:
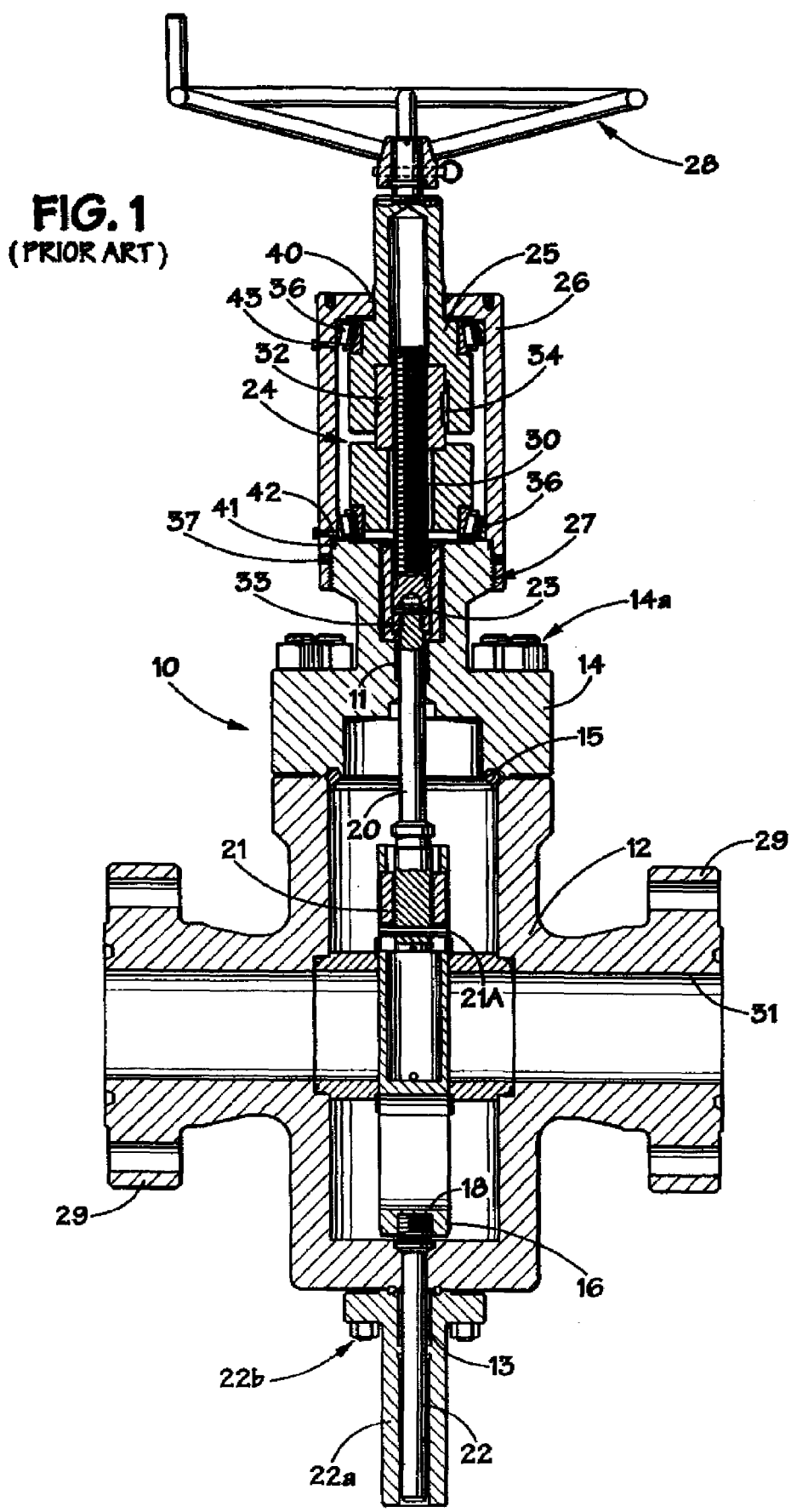
FIG. 1 is a cross-sectional view of an illustrative balanced stem gate valve design.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In general, the present invention is directed to a pressure balanced fluid control device. As will be recognized by those skilled in the art after a complete reading of the present application, the present invention may be employed with a variety of different devices and with a variety of different applications. For example, the illustrative valve described herein may be used in subsea or surface applications, e.g., subsea or surface wellhead or production facilities related to oil and gas production. Thus, the present invention should not be considered as limited to any particular type of fluid control device or to the intended use or function of such a device unless such limitations are expressly set forth in the appended claims. For ease of reference, in FIGS. 2 and 3A-3C, the same reference number will be employed to identify components of the valve that have been previously described with respect to FIG. 1. Thus, the description set forth above with respect to FIG. 1 may be applicable to the other figures set forth in the application.

Figure 2:
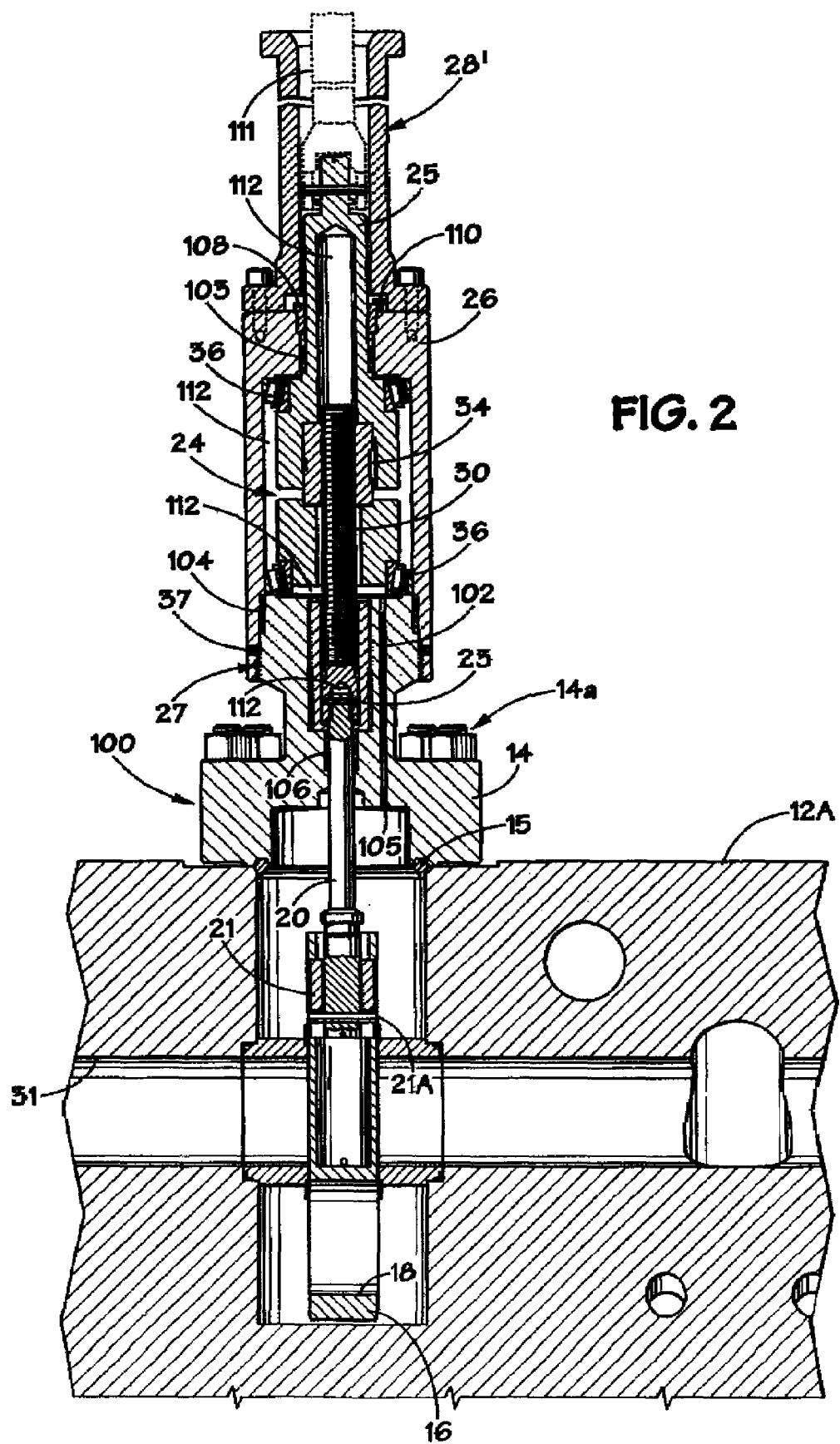
FIG. 2 is a cross-sectional view of one illustrative embodiment of the present invention.

FIG. 2 depicts one illustrative embodiment of a valve 100 where the present invention may be employed in a subsea application. As shown therein, the body 12A may be a portion of another structure, e.g., a Christmas tree, a tubing head, a wellhead, etc. The body 12A is intended to be representative in nature as the body 12A may be of any general shape or configuration, and it may be part of a larger structure, e.g., a piece of subsea equipment. The body 12A may also be a separate structure that is intended to only house the valve 100.

The opening 31 may one of many openings formed in a portion of the body 12. The opening 31 may also be the primary opening in the structure, i.e., the main bore extending through the subsea equipment, or it may be an ancillary flow path created within the subsea body. In any event, the gate 16 of the valve 100 may be used to regulate the flow of a working fluid through the opening 31. In one illustrative embodiment, as depicted in the drawings, an opening 102 is formed through the bonnet 14. The valve 100 further comprises a directional seal pack 103 between the bonnet cap 26 and the roller screw housing 25, a directional seal pack 104 between the bonnet cap 26 and the bonnet 14, and a bi-directional valve stem seal 106 between the bonnet 14 and the valve stem 20. The structure and composition of such directional and bi-directional seals are well known to those skilled in the art. A retaining ring 108 and locking nut 110 are used to retain the directional seal 103 in place. The bonnet cap 26 and the seals 103, 104, 106 define a sealed cavity 112, i.e., in all interior spaces within the area defined by the bonnet cap 26 and the seals 103, 104 and 106. In the depicted embodiment, the bonnet 14 is a separate component that may be coupled to the valve body 12A. However, after a complete reading of the present application, those skilled in the art will appreciate that the bonnet 14 may be a separate component or formed integral with the body 12A depending on the particular embodiment. Thus, the present invention should not be considered as limited to any particular embodiment or type of bonnet/body configuration unless such limitations are expressly recited in the appended claims.

Also depicted in FIG. 2 is a schematically depicted arm 111 of a remote operated vehicle (ROV) that may be used to actuate the illustrative valve depicted in FIG. 2. Such ROV vehicles and their use are well known in the art. In the depicted embodiment, the ROV arm 111 may be used to create a rotational force to actuate the valve 100 through use of the roller screw assembly 24. However, the present invention may be used in situations where other means are employed to actuate the valve, e.g., electric or hydraulic motors, manual actuation, etc. Moreover, although the valve 100 depicted herein is actuated by application of a rotational force to the roller screw assembly 24, the present invention may be used in applications where the valve is actuated by a push-pull mechanism, i.e., translational movement. In such an application, the ROV arm 111 may be used to push or pull on a component operatively coupled to the valve stem 20 to achieve the desired results. Thus, the present invention should not be considered as limited to the manner in which the valve is actuated or the means used to actuate the valve, unless such limitations are expressly set forth in the appended claims.

In the depicted embodiment, the opening 102 is in fluid communication with the sealed cavity 112, as well as the interior region of the body 12A. In one embodiment, the opening 102 is provided in the bonnet 14 such that the internal pressure existing within the body 12A, e.g., within the opening 31, may also exist within the sealed cavity 112 as defined by the bonnet cap 26, and the seals 103, 104 and 106. That is, the opening 102 is provided such that the pressure above the valve stem seal 106 is the same as the pressure within the body 12A of the valve 100, i.e., the working pressure ("WP") of the working fluid flowing through the opening 31 exists on both sides of the valve stem seal 106. In other embodiments, the opening 102 may extend entirely or at least partially through the body 12A such that pressure of the working fluid may be exerted on both sides of the valve stem seal 106, i.e., the opening 102 may not extend through the bonnet 14. In some cases, the opening 102 may be coupled to a conduit that extends between the opening formed in the body 12A and the sealed cavity 112.

In one illustrative embodiment, the opening 102 allows working fluid flowing through the valve 100 to enter into the sealed cavity 112. In this embodiment, there is no seal between the inlet 105 of the opening 102 and the sealed cavity 112 to prevent the flow of working fluid into the sealed cavity 112. By allowing the working fluid to enter the sealed cavity 112, the pressure on opposite sides of the valve stem seal 106 is equal, thereby balancing the pressure forces acting on the valve stem 20.

The size and configuration of the opening 102, as well as its position within the bonnet 14 and/or body 12A, may vary depending upon the particular application. In one illustrative embodiment, the opening 102 is positioned in the bonnet 14 and it has a diameter of approximately 1/16-1/8 inch. In general, the smaller the opening 102, the less likely particulate matter can traverse into the sealed cavity 112 and damage other components, e.g., the roller screw assembly 24. Of course, the components of the valve 100 that will be subjected to the fluid working pressure within the sealed cavity 112 will need to be designed to withstand such a working pressure. In the field of oil and gas production, the working pressure may be relatively high, e.g., on the order of 5,000-15,000 psi. For example, depending upon the application, the wall thickness of the bonnet cap 26 may need to be increased relative to bonnet caps not subjected to the working pressure of the working fluid.

Figure 3A:
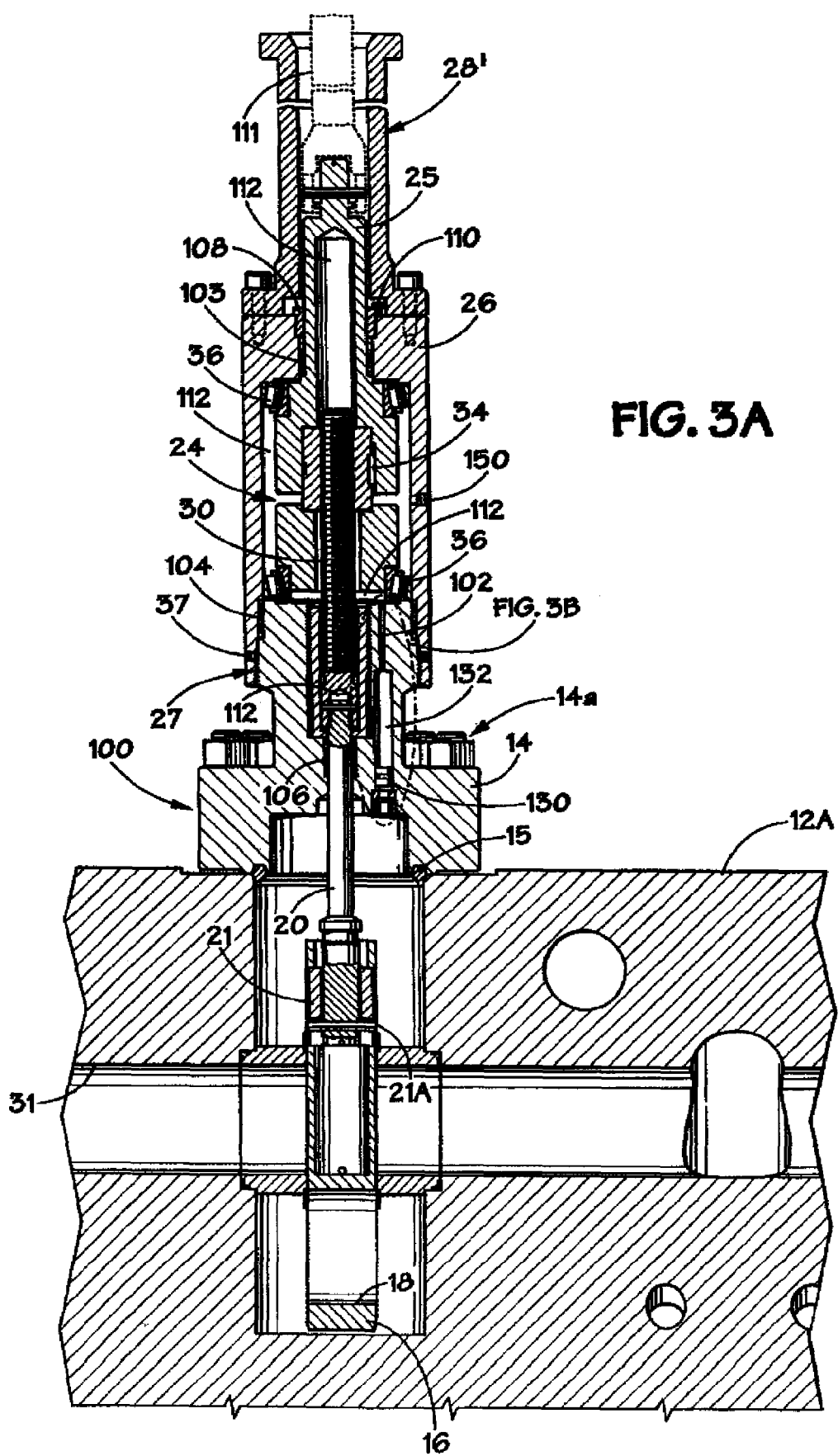
FIGS. 3A-3C are cross-sectional views of a gate valve in accordance with another illustrative embodiment of the present invention.
Figure 3B:
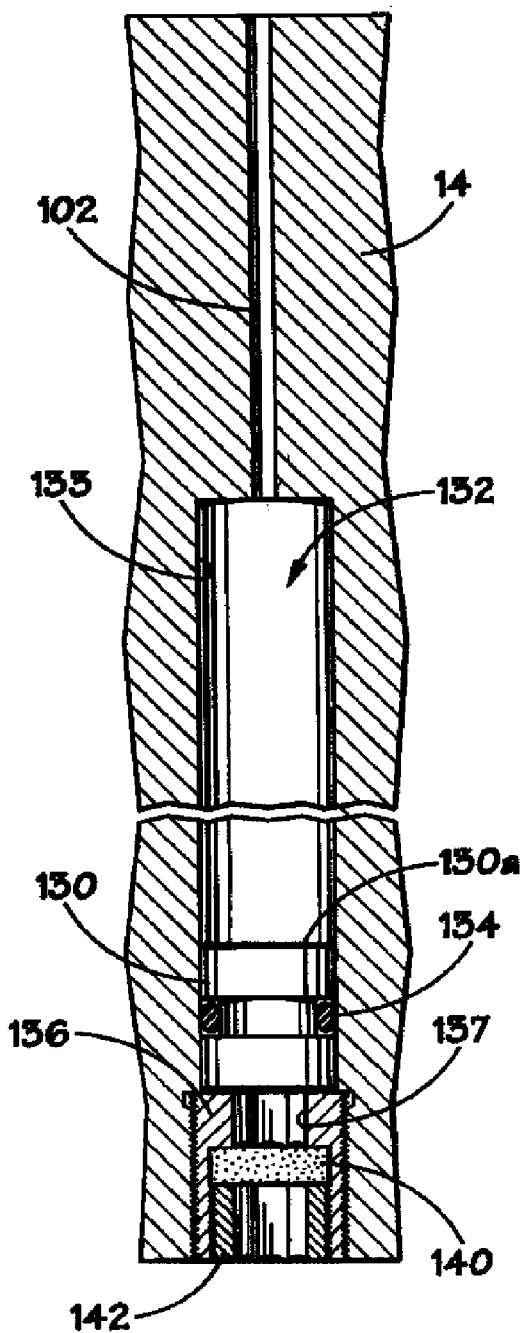
Figure 3C:
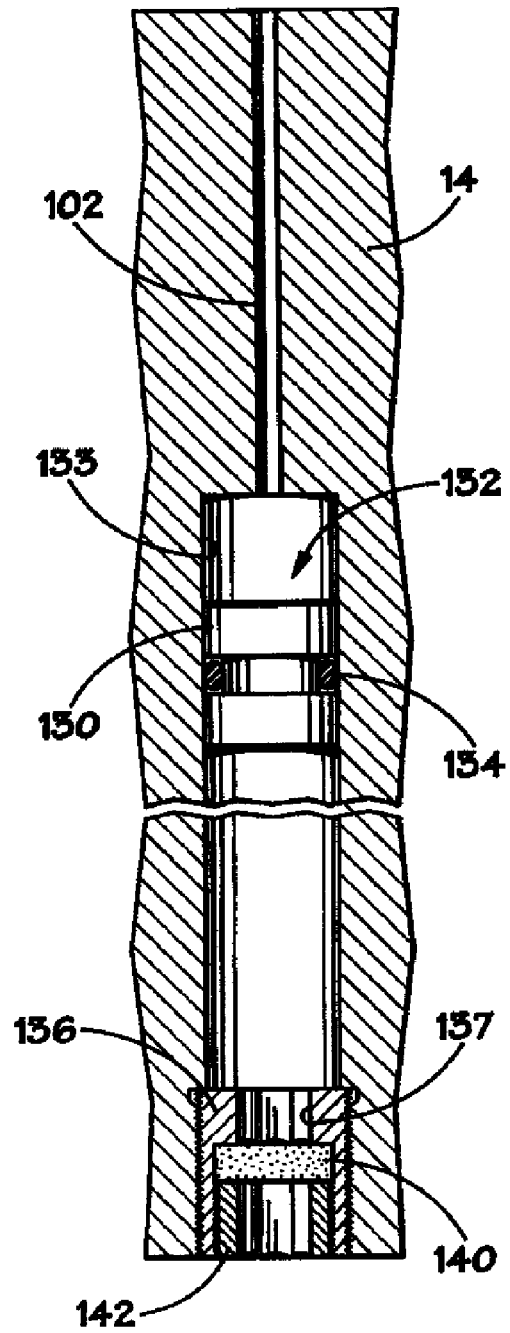

FIGS. 3A-3C depict yet another illustrative embodiment of a valve 100 in accordance with the present invention. As shown therein, the valve 100 comprises a piston 130 positioned in a piston chamber 132. In the depicted embodiment, the piston chamber 132 is formed in the bonnet 14. In some applications, the piston chamber 132 may be formed at some location within the body 12A. A filter 140 may also provided. A seal 134, e.g., an elastomer O-ring, is positioned around the piston 130 to provide sealing engagement between the piston 130 and the surface 133 of the piston chamber 132. The piston 130 is secured within the piston chamber 132 by a piston retainer 136 that is threadingly coupled to the interior of the piston chamber 132. That is, the piston retainer 136 is externally threaded while a portion of the interior of the piston chamber 132 is internally threaded. An opening 137 is provided in the piston retainer 136 to allow working fluid within the valve 100 to contact the piston 130. The piston chamber 132 is in fluid communication with the sealed cavity 112 (via the opening 102) and with the interior of the body 12. The size, location and configuration of the piston chamber 132 and the piston 130 may vary depending upon the particular application. In the illustrative embodiment depicted in FIGS. 3A-3C, the piston 130 and the piston chamber 132 have a generally circular cross-sectional configuration. In one illustrative embodiment, the piston 130 has a diameter of approximately 0.5-1.5 inches, and the piston chamber 132 has a depth of approximately 3-4 inches. The volume of the piston chamber 132 is sized to compensate for the contraction and/or expansion of the sealed cavity volume and the fluid in the sealed cavity 112 due to a variety of factors, such as external forces, temperature, air in the cavity 112, etc. The volume of the piston chamber 132 may vary depending upon the particular application.

If employed, the filter 140 may be positioned upstream or on the working fluid side of the piston 130 within the piston retainer 136 and secured therein by filter support housing 142. The filter support housing 142 is threadingly coupled to the piston retainer 136, i.e., the filter support housing 142 is externally threaded while a portion of the interior of the piston retainer 136 is internally threaded. The filter 140 may not be needed in all applications. When employed, the filter 140 acts as an additional safeguard to prevent particulate matter from entering the sealed cavity 112. When employed, the filter 140 may be of any size, configuration and material sufficient to perform the filtering actions described herein. In one illustrative embodiment, the filter 140 is a stainless steel mesh having an aperture size of approximately 0.057" and a nominal open area of approximately 55%. Although not depicted in FIG. 2, a filter may also be employed in the embodiment of the valve 100 depicted therein to filter the working fluid flowing through the opening 102. For example, a filter may be positioned over the opening 102 in a recess formed in the bonnet 14 and secured therein by a structure similar to the filter support housing 142.

A check valve 150 (see FIG. 3A) is provided in the bonnet cap 26. The check valve 150 allows the sealed cavity 112 and all spaces above the piston 130 to be filled with a lubricant fluid or a hydraulic fluid for lubrication. By using the piston 130 depicted in FIGS. 3A-3C, the internal working pressure within the valve 100 may be transmitted throughout the sealed cavity 112 while separating the working fluid, and the possible contaminants therein, from the sealed cavity 112 and components contained therein, e.g., the roller screw assembly 24.

FIGS. 3B and 3C are provided to depict an illustrative example of the situation where the piston 130 is subjected to working pressure of the working fluid flowing through the valve 100. FIG. 3B depicts the situation where the sealed cavity 112 has been filled with a lubricant fluid or a hydraulic fluid through the check valve 150. The hydraulic fluid is present in all open spaces throughout the sealed cavity 112, the opening 102 and the piston chamber 132 above the top surface 130a of the piston 130. At the point in time depicted in FIG. 3B, there is no internal pressure within the body 12. FIG. 3C depicts the piston 130 at a point where a working fluid is flowing through the valve 100 at a working pressure ("WP"). The piston 130 is exposed to the working fluid via the opening 137 in the piston retainer 136. As can be seen in FIG. 3C, the piston 130 has moved upward within the piston chamber 132 and the pressure above and below the piston 130 is equal to the working pressure (WP) of the working fluid flowing through the valve 100. The piston 130 may or may not move when subjected to the working pressure of the working fluid. Typically, there will be some movement due to the existence of very small air pockets within the sealed cavity 112, expansion of some of the components that define the sealed cavity 112, e.g., the bonnet cap 26, etc. In general, the movement of the piston 130 should be relatively minimal.

Through use of the present invention depicted in FIGS. 3A-3C, the working pressure ("WP") of the working fluid flowing through the valve 100 is transmitted to the sealed cavity 112 while effectively isolating the working fluid from the cavity 112 itself. Ultimately, by equalizing the pressure on both sides of the valve stem seal 106, the stem 20 is balanced and there is no net force acting on the roller screw assembly 24 that will tend to undesirably "back-drive" the roller screw 30. As a result of the novel inventions provided herein, a balanced stem valve 100 is provided without the need of providing an offsetting balance stem. In turn, the valve 100 of the present invention is more compact and may be employed in situations where space availability is limited.

As will be recognized by those skilled in the art after a complete reading of the present application, the components of the valves described herein may be manufactured from a variety of materials commonly found in traditional valves, e.g., carbon steel, stainless steel, etc. Moreover, the valve 100 described herein may be oriented in any desired direction, e.g., where the valve stem 20 is disposed vertically, horizontally or at any other angle.

The present invention is directed to a pressure balanced fluid control device. In one illustrative embodiment, the device comprises a body, a valve stem operatively coupled to a gate positioned in the body, a valve stem seal positioned around the valve stem, wherein a sealed cavity exists above the valve stem seal, and an opening in fluid communication with the sealed cavity and an interior region of the body, the opening allowing a pressure of the working fluid to be exerted in the sealed cavity above the valve stem seal.

In another illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and an opening through the bonnet that is adapted to allow a pressure of a working fluid flowing through the valve to be exerted in the sealed cavity above the valve stem seal.

In yet another illustrative embodiment, the device comprises a body, a valve stem operatively coupled to a gate positioned in the body, a valve stem seal positioned around the valve stem, wherein a sealed cavity exists above the valve stem seal, and an opening through the body that allows a pressure of the working fluid to be exerted in the sealed cavity above the valve stem seal.

In another illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and an opening through the bonnet, the opening being in fluid communication with the sealed cavity and an interior region of the body.

In yet another illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and an opening through the bonnet that is adapted to allow a working fluid flowing through the valve to enter the sealed cavity, thereby exerting a pressure of the working fluid in the sealed cavity above the valve stem seal.

In still another illustrative embodiment, the device comprises a body, a bonnet coupled to the body, a valve stem operatively coupled to a gate positioned in the body, a bonnet cap coupled to the bonnet, a roller screw assembly operatively coupled to the valve stem, the roller screw assembly comprising a housing, a portion of which extends through the bonnet cap, a first valve stem seal positioned between the valve stem and the bonnet, a second seal positioned between the bonnet cap and the bonnet, and a third seal positioned between the bonnet cap and the housing, wherein a sealed cavity exists above the first valve stem seal, the sealed cavity being defined by a portion of the bonnet cap, the first valve stem seal, the second seal and the third seal, and an opening through the bonnet that is adapted to allow a working fluid flowing through the device to enter the sealed cavity, thereby exerting a pressure of the working fluid in the sealed cavity above the valve stem seal.

In a further illustrative embodiment, the device comprises a body, a valve stem operatively coupled to a gate positioned in the body, a valve stem seal positioned around the valve stem, wherein a sealed cavity exists above the valve stem seal, a piston chamber, the piston chamber being in fluid communication with the sealed cavity and an interior region of the body, and a piston positioned in the piston chamber.

In yet a further illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, a piston chamber formed in the bonnet, the piston chamber being in fluid communication with the sealed cavity and an interior region of the body, and a piston positioned in the piston chamber.

In yet a further illustrative embodiment, the device comprises a body, a bonnet coupled to the body, a valve stem operatively coupled to a gate positioned in the body, a bonnet cap coupled to the bonnet, a roller screw assembly operatively coupled to the valve stem, the roller screw assembly comprising a housing, a portion of which extends through the bonnet cap, a first valve stem seal positioned between the valve stem and the bonnet, a second seal positioned between the bonnet cap and the bonnet, and a third seal positioned between the bonnet cap and the housing, wherein a sealed cavity exists above the first valve stem seal, the sealed cavity being defined by a portion of the bonnet cap, the first valve stem seal, the second seal and the third seal, a piston chamber formed in the bonnet, the piston chamber being in fluid communication with the sealed cavity and an interior region of the body, and a piston positioned in the piston chamber.

In still a further illustrative embodiment, the device comprises a body, a bonnet coupled to the body, a valve stem operatively coupled to a gate positioned in the body, a valve stem seal positioned between the valve stem and the bonnet, wherein a sealed cavity exists above the valve stem seal, and means for allowing a pressure of a working fluid flowing through the valve to be exerted in the sealed cavity while preventing the working fluid from entering the sealed cavity.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A device, comprising:
   a body;
   a valve stem operatively coupled to a gate positioned in said body;
   a valve stem seal positioned around said valve stem, wherein a sealed cavity exists above said valve stem seal;
   a piston chamber, said piston chamber being in fluid communication with said sealed cavity and an interior region of said body; and
   a piston positioned in said piston chamber that substantially isolates said sealed cavity from said interior region of said body.

2. The device of claim 1, wherein said piston chamber is formed in a bonnet that is coupled to said body.

3. The device of claim 1, wherein said piston chamber is formed in a portion of said body.

4. The device of claim 1, wherein said valve stem is operatively coupled to a roller screw.

5. The device of claim 1, further comprising a piston retaining ring that is adapted to retain said piston in said piston chamber.

6. The device of claim 5, further comprising a filter positioned between said piston and said interior region of said body.

7. The device of claim 5, further comprising:
   a filter positioned between said piston and said interior region of said body; and
   a filter support ring to retain said filter in position, said filter support ring being threadingly coupled to said piston retaining ring.

8. The device of claim 1, wherein said valve stem seal is a bi-directional seal.

9. The device of claim 1, wherein said sealed cavity is at least partially defined by a bonnet cap.

10. The device of claim 1, further comprising a seal positioned between said piston and said piston chamber.

11. The device of claim 1, further comprising a hydraulic fluid positioned in said sealed cavity above said piston, wherein said hydraulic fluid is adapted to be substantially isolated from a working fluid within said body by said piston.

12. A device, comprising:
a body;
a bonnet coupled to said body;
a valve stem operatively coupled to a gate positioned in said body;
a valve stem seal positioned between said valve stem and said bonnet, wherein a sealed cavity exists above said valve stem seal;
a piston chamber formed in said bonnet, said piston chamber being in fluid communication with said sealed cavity and an interior region of said body; and
a piston positioned in said piston chamber that substantially isolates said sealed cavity from said interior region of said body.

13. The device of claim 12, wherein said valve stem is operatively coupled to a roller screw.

14. The device of claim 12, further comprising a piston retaining ring that is threadingly coupled to said bonnet, said piston retaining ring being adapted to retain said piston in said piston chamber.

15. The device of claim 14, further comprising a filter positioned in said bonnet between said piston and said interior region of said body.

16. The device of claim 14, further comprising:
a filter positioned in said bonnet between said piston and said interior region of said body; and
a filter support ring to retain said filter in position, said filter support ring being threadingly coupled to said piston retaining ring.

17. The device of claim 12, wherein said valve stem seal is a bi-directional seal.

18. The device of claim 12, wherein said sealed cavity is at least partially defined by a bonnet cap that is coupled to said bonnet.

19. The device of claim 12, wherein said sealed cavity is at least partially defined by a bonnet cap that is coupled to said bonnet, a seal between said bonnet and said bonnet cap, and said valve stem seal.

20. The device of claim 12, further comprising a seal positioned between said piston and said piston chamber.

21. The device of claim 12, further comprising a hydraulic fluid positioned in said sealed cavity above said piston, wherein said hydraulic fluid is adapted to be substantially isolated from a working fluid within said body by said piston.

22. A device, comprising:
a body;
a bonnet coupled to said body;
a valve stem operatively coupled to a gate positioned in said body;
a bonnet cap coupled to said bonnet;
a roller screw assembly operatively coupled to said valve stem, said roller screw assembly comprising a housing, a portion of which extends through said bonnet cap;
a first valve stem seal positioned between said valve stem and said bonnet, a second seal positioned between said bonnet cap and said bonnet, and a third seal positioned between said bonnet cap and said housing, wherein a sealed cavity exists above said first valve stem seal, said sealed cavity being defined by a portion of said bonnet cap, said first valve stem seal, said second seal and said third seal;
a piston chamber formed in said bonnet, said piston chamber being in fluid communication with said sealed cavity and an interior region of said body; and
a piston positioned in said piston chamber that substantially isolates said sealed cavity from said interior region of said body.

23. The device of claim 22, further comprising a piston retaining ring that is threadingly coupled to said bonnet, said piston retaining ring being adapted to retain said piston in said piston chamber.

24. The device of claim 23, further comprising a filter positioned in said bonnet between said piston and said interior region of said body.

25. The device of claim 23, further comprising:
a filter positioned in said bonnet between said piston and said interior region of said body; and
a filter support ring to retain said filter in position, said filter support ring being threadingly coupled to said piston retaining ring.

26. The device of claim 22, wherein said valve stem seal is a bi-directional seal.

27. The device of claim 22, further comprising a seal positioned between said piston and said piston chamber.

28. The device of claim 22, further comprising a hydraulic fluid positioned in said sealed cavity above said piston, wherein said hydraulic fluid is adapted to be substantially isolated from said working fluid by said piston.

29. A device adapted to have a working fluid flow therethrough, said device comprising:
a body;
a bonnet coupled to said body;
a valve stem operatively coupled to a gate positioned in said body;
a valve stem seal positioned between said valve stem and said bonnet, wherein a sealed cavity exists above said valve stem seal; and
means for allowing a pressure of said working fluid to be exerted in said sealed cavity while preventing said working fluid from entering said sealed cavity.

30. The device of claim 29, wherein said means comprises a piston positioned in a piston chamber formed in said body, said piston chamber being in fluid communication with said sealed cavity and an interior region of said body.

31. The device of claim 29, wherein said means comprises an opening through said valve body that is in fluid communication with said sealed cavity and an interior region of said body.

32. The device of claim 29, further comprising a roller screw operatively coupled to said valve stem.

33. The device of claim 30, further comprising a filter positioned in a recess in said bonnet upstream of said piston.

34. The device of claim 30, further comprising a piston retaining ring that is threadingly coupled to said bonnet.

35. The device of claim 33, further comprising a filter support ring to retain said filter.

* * * * *